United States Patent [19]

Shamis

[11] Patent Number: 5,529,202
[45] Date of Patent: Jun. 25, 1996

[54] CLOSURE FOR CONTAINERS AND THE LIKE

[76] Inventor: Neal B. Shamis, 3618 Palm Canyon Dr., Northbrook, Ill. 60062

[21] Appl. No.: 31,638

[22] Filed: Mar. 15, 1993

Related U.S. Application Data

[63] Continuation-in-part of Ser. No. 690,516, Apr. 24, 1991, abandoned.

[51] Int. Cl.$^6$ .................................................. B65D 41/06
[52] U.S. Cl. ........................... 220/301; 220/295; 220/713
[58] Field of Search .................................. 220/90.2, 90.4, 220/293, 295, 297, 300, 301, 705, 711, 713

[56] References Cited

U.S. PATENT DOCUMENTS

| | | | |
|---|---|---|---|
| D. 233,317 | 10/1974 | Catelli | D9/176 |
| D. 241,906 | 10/1976 | Dart | D7/70 |
| 253,075 | 1/1882 | Lyon | 220/300 |
| 1,687,887 | 10/1928 | Pletcher | 220/301 |
| 1,738,893 | 12/1929 | O Grady | 220/301 |
| 3,107,857 | 8/1963 | Freedman | 215/100 |
| 3,458,164 | 7/1969 | Massey | 248/145.6 |
| 3,963,206 | 6/1976 | Scolaro et al. | 248/105 |
| 4,552,276 | 11/1985 | Buch | 215/100 A |
| 4,627,547 | 12/1986 | Cooke . | |
| 4,830,206 | 5/1989 | Fisher | 215/209 |
| 4,850,496 | 7/1989 | Ruddell | 215/12.1 |
| 4,925,052 | 5/1990 | Betka et al. . | |
| 5,072,850 | 12/1991 | Gagnon et al. | 220/300 |
| 5,232,115 | 8/1993 | Bauer | 220/295 |

FOREIGN PATENT DOCUMENTS

| | | |
|---|---|---|
| 1060385 | 5/1972 | Canada . |
| 570831 | 9/1923 | France . |
| 7338329 | 10/1972 | France . |
| 107687 | 12/1923 | Switzerland . |

*Primary Examiner*—Stephen J. Castellano
*Attorney, Agent, or Firm*—Jerry A. Schulman

[57] ABSTRACT

A closure for a container has a lid combining positively interengaging latches with a biasing feature which urges the lid upward with respect to the container in order to more firmly effect latching. A series of projections formed along the interior upper periphery of the container register with latching slots formed along the outer surface of a skirt which depends from the lid, which is dimensioned to fit closely within the opening of the container. An annular flange extends from the outermost periphery of the lid to overlap a portion of the skirt. The outer upper periphery of the container is tapered outwardly to force the flange to flex when the lid is placed on the container thus imparting an upward force to the lid and, thereby, to the lug-and-latch combinations when the lid is turned to register the lugs with the latches. A handle assembly is attachable to the exterior of the container. Other embodiments include use of the closure on medicine vials as a child-resistant closure, and on overcontainers for carrying dangerous or hazardous materials.

58 Claims, 14 Drawing Sheets

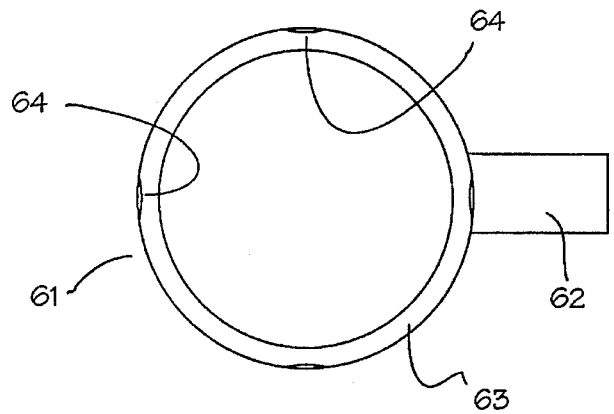
FIG. 11
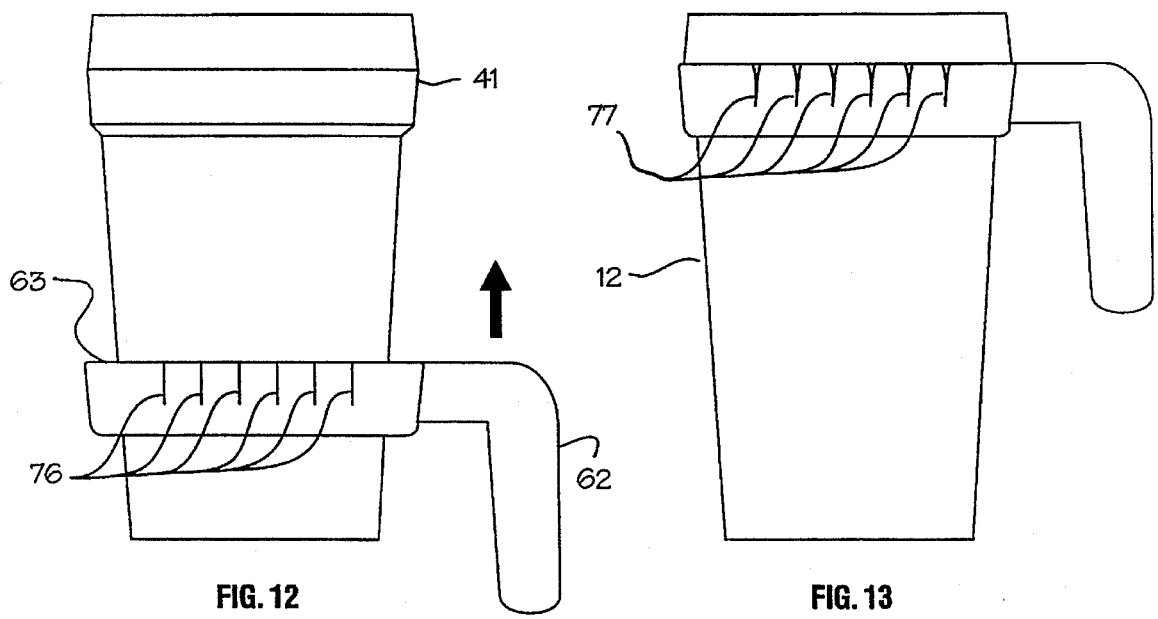
FIG. 12  FIG. 13

CLOSURE FOR CONTAINERS AND THE LIKE

FIELD OF THE INVENTION

This is a continuation-in-part of my application Ser. No. 690,516, filed Apr. 24, 1991, and now abandoned. This invention relates to closures for containers such as medicine vials and for drinking cups for infants and children and, more particularly, to a lid-and-cup combination with an interconnection feature which makes the lid difficult for infants and children to remove, yet which allows adults to simply and effectively remove the lid to clean or fill the cup or remove the contents.

BACKGROUND OF THE INVENTION

Drinking cups for infants and children are old and well-known. Such cups are sometimes referred to as "training cups" and are intended to be the next step beyond the use of a baby bottle to teach children to drink from a glass or cup.

Such drinking cups typically include a container, or "tumbler" portion which holds the liquid and a cover which attaches to the tumbler and which covers all or most of the opening of the tumbler. Use of the cover is intended to minimize spills which may otherwise occur when the child drops or upsets the cup and allow the child to tip the cup upward to a drinking position without having the entire contents of the cup pour out all at once. Examples of such cups are shown in already-issued U.S. patents.

For example, U.S. Pat. No. 2,640,337 (Bryant) shows a baby cup having a lid which covers a substantial portion of the tumbler opening and has a hole through which the child may drink. U.S. Pat. No. 2,765,632 (Bryant) shows generally the same type of cup with a cover that entirely closes off the tumbler opening with the exception of a passage through which the child may drink.

U.S. Pat. No. Des. 216,730 (Carslaw) and U.S. Pat. No. D. 233,972 (Juhlin) both show drinking cups having lids which completely close off the tumbler opening, with each lid having a spout through which the child can drink. Both of these references also show the use of handles attached to the outer periphery of the cup to provide a convenient hand grip for the child. A similar construction is shown in U.S. Pat. No. 2,792,696 (Stayart) showing a cup with handles and with a cover that completely closes off the tumbler opening.

U.S. Pat. No. 3,412,892 (Waksman, et al.) shows a cup with a lid having a drinking opening that may be selectively opened or closed. U.S. Pat. No. 4,850,496 (Rudell et al.) shows a drinking cup having a tumbler with external screw threads formed at its uppermost periphery and a series of interchangeable lids which may be attached to the top of the cup, with the lids varying from a nipple-like arrangement to a collar which approximates an open-mouthed cup. U.S. Pat. No. 4,600,111 (Brown) shows another cup construction which uses a threaded collar to hold different cup covers in place, allowing the cup to be used in configurations ranging from a baby bottle to a training cup.

U.S. Pat. No. 4,121,731 (Okerstrum) shows a child's drinking cup having a pair of handles which must be squeezed inwardly in order to open the lid closure to allow a child to drink from the cup.

One common characteristic of such cups is that the efficacy of the cup will be completely destroyed should the child learn how to remove the lid, allowing the liquid inside to spill either when the cup is upset or during the child's attempts to drink from the cup without fully having learned to do so. If the lid is too easy to remove, the cup's usefulness as a training device is extremely limited. If the lid is too difficult to remove, this will discourage the use of the cup by adults who will find it inconvenient or awkward to open the cup to put liquid in it, or to wash the cup.

The concept of producing a container with a lid more easily removable by an adult than a child is also well represented in the prior art by patents drawn to child-resistant closures for securing containers which contain drugs, medicines or such potentially hazardous or poisonous substances as cleaning fluids.

Typical and representative of such devices is U.S. Pat. No. 4,429,800 (Greenspan) which shows a container and lid combination. The lid may be removed only upon the simultaneous depression of a pair of tabs on the lid and these tabs are sized and spaced to make it much easier for an adult to manipulate them than a child. U.S. Pat. No. 4,087,016 (Towns et al.) shows a safety cap which must be rotated with respect to the container to a predetermined position before the cap can be disengaged from the container.

U.S. Pat. No. 4,807,768 (Gach) shows a snap-cap which, when closed, requires the simultaneous compression of a pair of oppositely-disposed tabs to enable the cap to be opened. U.S. Pat. No. 4,830,206 (Fisher) describes a tamper-resistant container having a lid with a pair of internally-extending ears which interconnect with a pair of hooks formed on the interior of the container. In order to release the hooks, a specific portion of the lid's periphery must be compressed while the container is simultaneously twisted or rotated with respect to the lid. U.S. Pat. No. 4,442,945 (Sandhaus) shows a safety closure having both a locking and non-locking mode so that the user may select which mode is appropriate.

U.S. Pat. No. 4,345,691 (Burke) shows a closure for spray containers or other types of dispensing bottles with an anti-opening mechanism which is not designed to be defeated, thus making it possible to assemble a spray bottle with a spray top which cannot be removed.

Another feature which is described in the prior art with respect to safety closures is the type of closure that has a series of inter-connecting latches, typically engaged when the lid of the container is rotated with respect to the container. Several such constructions use a biasing element to urge the lid upward, that is, away from the container to enhance the positive latching feature. Thus, the biasing of the lid or cover forces the mating portions of the latch more tightly together.

U.S. Pat. Nos. 4,526,281 (Herr) and 4,053,078 (Herr) teach and describe a closure having lugs formed on the interior of the cover which interengage with hooks or latches formed on the outer periphery of the container. Biasing of the lid with respect to the container is accomplished by either a fitment spring or by pressure exerted by the uppermost portion of the container against the lid.

U.S. Pat. Nos. 4,059,189 (Mumford) and 4,383,619 (Mumford et al.) illustrate a closure having a similar arrangement, with the interior periphery of the lid having a number of lugs formed thereon which mate with projections formed on the outer upper periphery of the container. A separate liner is placed across the container opening to act as a biasing element forcing the lid upward with respect to the container when the lugs are engaged with the projections.

U.S. Pat. Nos. 4,627,547 (Cooke '547) and 4,739,890 (Cooke '890) show containers having lids with hook elements positioned around the inner periphery with mating latch elements positioned around the outer upper periphery of the container. A resilient pad or liner is inserted into the lid which is then compressed against the container when the lid is forced down and twisted in order to engage the mating hook members.

A medicine vial bearing the notation "U.S. Pat. No. 4,739,890" has been inspected and is shown herein as part of the drawings. The vial has a lid with lug members formed about the inner periphery, and a container with mating latches formed about its outer upper periphery. Similar features are shown in the '890 and '547 Cooke patents.

The lid also has an inner cylindrical skirt attached to the underside of the cap which forms an annular channel between the skirt and the sidewall of the cap. Holes are formed through the top of the cap which extend into the annular channel. The upper, inner portion of the container is thickened slightly inwardly, top to bottom. None of these features are described in either the '890 or '547 Cooke patents, nor are they explained in U.S. Pat. Nos. 3,888,376, 3,952,899, 4,139,112, 4,434,903 or 4,706,837, all issued to Cooke as well.

U.S. Pat. No. 4,834,251 (Yu) shows a medicine bottle having a measuring cup which attaches over the cover for the bottle. The base of the cup is formed with a convex section which, when placed over the opening to the bottle, is compressed. A series of projections is formed on the outer periphery of the bottle which mate with corresponding latch elements formed on the interior of the measuring cup. The biasing force exerted when the concave bottom of the measuring cup contacts the bottle cover serve to hold the latching mechanisms in closer engagement.

BRIEF DESCRIPTION OF THE INVENTION

A closure system utilizes cooperating structure formed on two telescopically-mating cylindrical members to create a positive locking force that must be overcome to separate the two members. In a first embodiment of the invention, a drinking cup has a container used for holding liquid and a lid used to close off the opening of the container. A series of lugs is formed on the interior of the container. The lid has a skirt depending therefrom and extending into the interior of the container. Latch members are formed on the outer surface of the skirt and are sized and positioned to register with the lugs when the lid is rotated with respect to the container.

A depending flange is formed on the lid coaxial with and uniformly spaced from the depending skirt. The flange is shaped and dimensioned to flex outwardly and the upper outer periphery of the container is formed with a ramp which forces the flange to flex outwardly from the skirt when the upper outer periphery of the container is placed within the annular space formed between the lid and the skirt and the lid is forced downward onto the container. The lid is formed from a thermoplastic material having a memory which urges the flange to return to its original, unstressed position. The force exerted by this flexing of the flange causes the lid to be urged in an upward position away from the container and this upward biasing force helps to seat and hold the lugs in the latch members. A substantial portion of the inner surface of the flange contacts the outer surface of the cup, and a substantial portion of the outer surface of the skirt contacts the inner surface of the cup, providing a seal that is resistant to the leakage of fluids.

In a modification of the invention, the lid is manually pulled upward to allow the flange to move toward its unstressed position which, along with the frictional force at the flange/cup and cup/skirt interfaces, retains the lid in place and creates a positive resistance to the removal of the lid.

The latching feature may be defeated by pressing the lid downward sufficiently to overcome the resistance described above to allow the lugs to clear the latch members and then rotating the lid with respect to the container in order to move the lugs out of register with the latches. Once this is done, the lid may be lifted vertically and removed.

A handle assembly can be fitted to the exterior of the cup without interfering with the operation of the closure to provide a grip during drinking.

In a second preferred embodiment of the invention, a vial or bottle used for holding medicines, such as prescription medicines, has a lid-and-container combination with a closure formed thereon in accordance generally with the foregoing description. Modifications in the construction of the vial, such as the number, shape and location of the lugs and latches, and the relative proportions of the lid can make the closure either fully child-resistant or more easily openable for physically disabled users.

In a third preferred embodiment of the invention, an "overcontainer" is constructed which allows for the storage and transport of such biologically-sensitive materials as blood or urine. Variations of the closure described above make the difficulty for opening the overcontainer a maximum, while variations in the construction of the top and base of the overcontainer provide an improved grip to operate the closure.

Manufacture of two-piece lid constructions for child-resistant medicine vial closures is more expensive in terms of material and assembly time than if one-piece molded lids are used. For example, if the container is to be used for storing and transporting a urine specimen for drug testing, the additional piece fitted to the lid may have to be separately sterilized and then assembled to the lid in a sterile environment, whereas a single-piece lid can be sterilized in a single operation and then packaged with no subsequent assembly. If the purchaser of a prescription drug removes the additional piece from the lid after purchasing the product, or if the piece becomes dislodged accidentally, the child-resistant feature of the vial is compromised, if not made totally inoperative.

Another important consideration is to combine a single-piece lid with additional means to limit or prevent leakage from the container, or external contamination of the container's contents. Again, using the example of a urine specimen container, the test results would be seriously compromised if the contents were somehow contaminated. Where such a container is used to collect and transport blood specimens, there is certainly a danger and concern that blood leaking from the container could carry the AIDS virus, or another virulent and contagious bacteria or virus, so limitation and prevention of leakage is an important concern.

Where product integrity is of concern, a one-piece lid of the type described herein should use a closure system that makes it simple to apply tamper-proof or tamper-evident expedients to the container after it has been sealed.

Accordingly, the need exists for a closure which makes possible the use of a one-piece lid fitted to a container in such a manner as to make it selectively more or less difficult to remove the lid.

The need also exists for such a lid to impart a positive, locking force in combination with the container.

The need also exists for such a closure to include structure minimizing the possibility of leakage or contamination of the container's contents.

Further, the need exists for such a closure to be made in a manner which allows the use of tamper-evident seals.

DETAILED DESCRIPTION OF THE DRAWINGS

These and other features of the present invention may best be understood upon consideration of the accompanying drawings, wherein:

FIG. 11 is a top elevation of the cup handle;

FIG. 12 is a side elevation of the cup showing the cup handle partially assembled to the cup;

FIG. 13 is a side elevation of the cup showing the cup handle fully assembled to the cup;

DETAILED DESCRIPTION OF THE INVENTION

Figure 1:
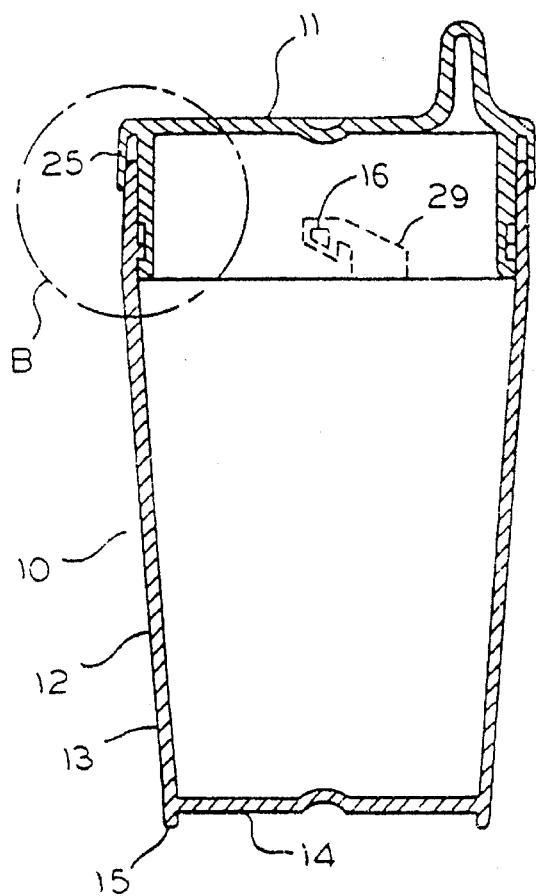
FIG. 1 is a sectional view of the present invention showing the lid assembled to the container with trapezoidal latching projections.

Referring now to FIG. 1, the numeral 10 indicates generally a sectional view of a drinking cup as described and claimed herein. Cup 10 consists generally of a lid 11 attachable to a container or tumbler 12 which can be filled with a drink for the child. As shown in FIG. 1, container 12 is formed with a cylindrical, upstanding sidewall 13 attached integrally and liquid-tightly to a bottom 14. In one preferred embodiment, shown in FIG. 1, bottom 14 is offset from lower lip 15 of container 12, while, in FIG. 2, another preferred embodiment is shown with bottom 14 joined to sidewall 13 at the lowermost extremity of sidewall 13.

Figure 2:
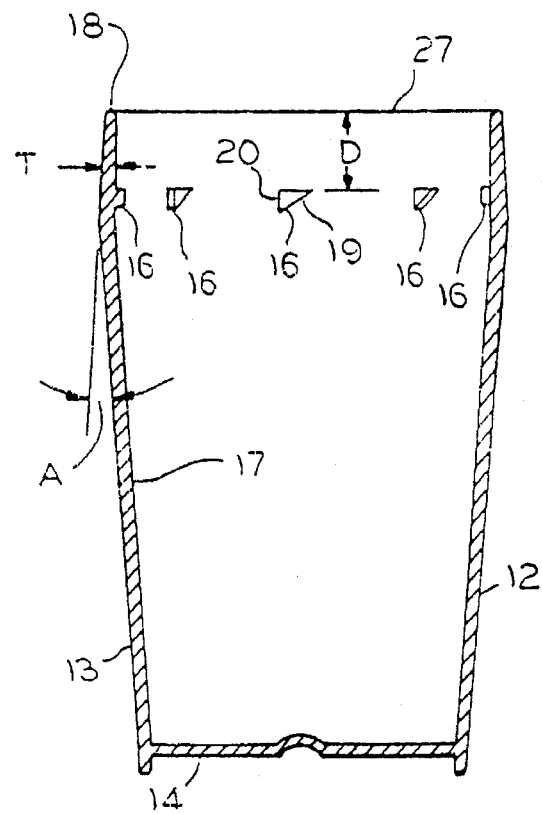
FIG. 2 is a sectional view of a second embodiment of the container showing the latching projections formed therewithin.

As shown in FIGS. 1 and 2, a series of lugs 16 are formed on the surface of interior wall 17 of container 12. In the embodiment shown herein, lugs 16 are preferably formed as trapezoids (FIG. 1) or right triangles (FIG. 2) spaced radially equidistantly about the interior of container 12 and at an identical distance D from upper lip 18 of container 12. Each lug 16 is formed with a ramp 19, included at an angle from the horizontal, and a stop 20 extending in a generally downward direction. Lugs 16 are formed and positioned to enter and engage with latches formed on lid 11, to be described hereinafter in greater detail.

Figure 3:
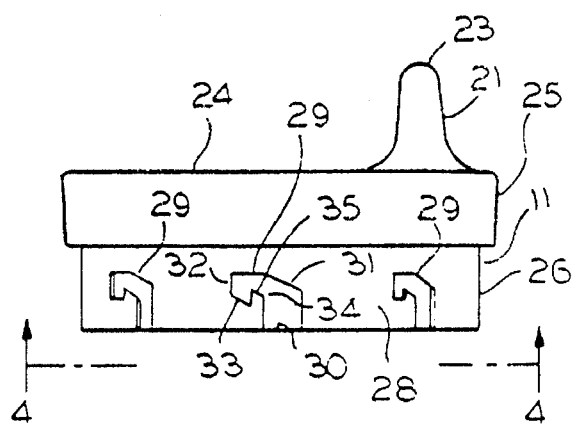
FIG. 3 is a side elevation of the lid of the present invention showing the latches formed thereon.
Figure 4:
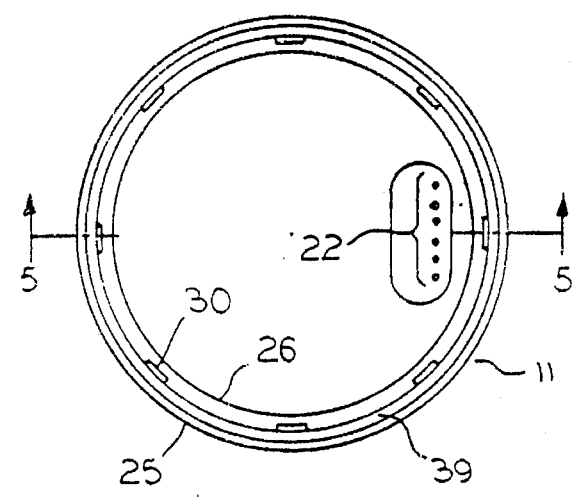
FIG. 4 is a top view of the lid shown in FIG. 3.

FIG. 3 is a lateral elevational view of lid 11. In a preferred embodiment, both container 12 and lid 11 are circular in cross-section. As best seen in FIG. 3 and FIG. 4 (a bottom view of lid 11 as viewed along line 4—4 in FIG. 3), in a preferred embodiment of the invention, intended for use as a child's drinking cup, lid 11 has a drinking spout 21 formed integrally therewith with a series of drinking apertures 22 formed on upper spout surface 23 through which the drink placed in container 12 can be ingested when lid 11 is assembled to container 12.

Figure 5:
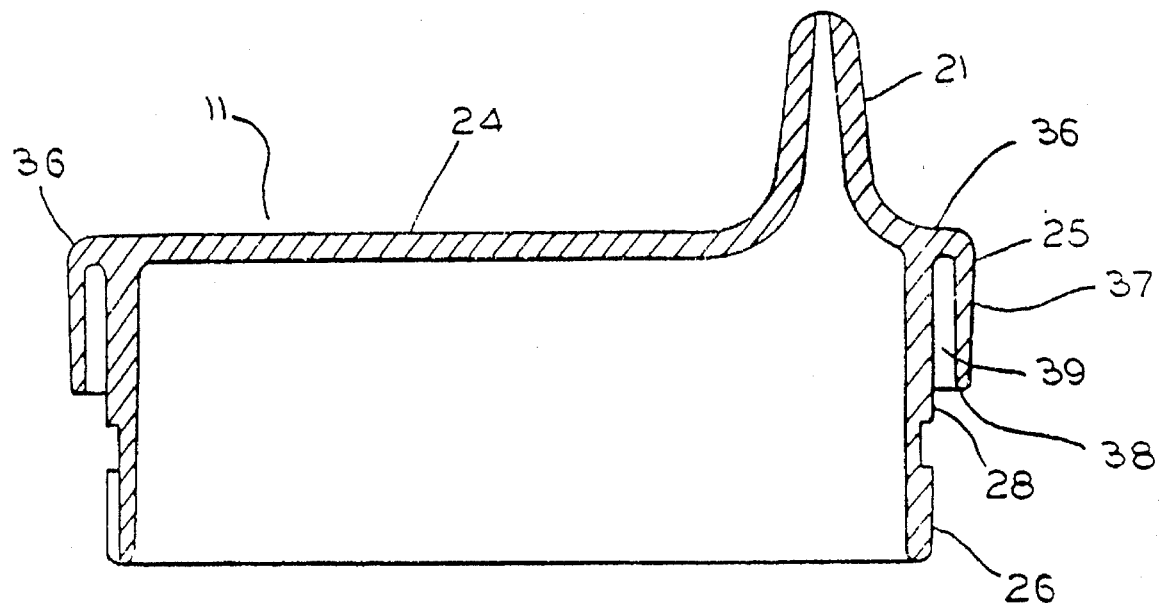
FIG. 5 is a sectional view of the lid shown in FIG. 3.

As best seen in FIG. 3, lid 11 has a top 24 formed integrally with drinking spout 21, and a depending flange 25 which, in this preferred embodiment, extends about the entire periphery of lid 11. As best seen in FIG. 3 and FIG. 5, lid 11 also includes a depending skirt 26 formed integrally with top 24 and flange 25. FIG. 5 is a sectional view of the lid shown in FIG. 3, taken along line 5—5 of FIG. 4. As seen in FIG. 3 and FIG. 5, skirt 26 has a smaller cross-sectional diameter than flange 25 and is sized to fit within mouth 27 of container 12 such that the surface of outer skirt wall 28 contacts interior wall surface 17 in a manner to be described more fully hereinafter.

As best shown in FIG. 3, lid skirt 26 has formed thereon a number of latches 29 formed beneath skirt surface 28. In a preferred embodiment, one such latch 29 is positioned to interengage each lug 16. Each latch 29 has an entry 30 extending upward to upper latch wall 31 and, thereafter, laterally toward latch end wall 32. Lower latch wall 33 extends from latch end wall 32 and terminates in latch stop 34, formed with an upper latch stop surface 35. Both lower latch wall 33 and upper latch stop surface 35 are preferably formed with approximately the same angle of inclination as lug ramp 19. Each latch 29 is thus formed as a blind channel with its entry 30 commencing at the lowermost edge of skirt 26, as shown in FIG. 5.

The interengagement of lugs 16 and latches 29 may be described as follows. Lid 11 is turned to align one latch entry 30 with each lug 16. After such alignment has been effected, lid 11 is pressed downwardly onto container 12 such that outer skirt surface 28 of skirt 26 slides along interior wall surface 17 of container 12 until each lug 16 has contacted its corresponding upper latch 31. At that point, lid 11 is rotated with respect to container 12 to bring each lug 16 past latch stop 34 such that lug ramp 19 registers with lower latch wall 33. During rotation, lug ramp 19 contacts upper latch stop surface 35 to create a camming action forcing lid 11 downward or toward container 12. When lug 16 is fully registered with latch 29, the engagement of lug 16 with latch end wall 32 will prevent lid 11 from being rotated any further. The engagement of latch stop 34 and lug stop 20 will prevent the removal of lid 11 from container 12.

To defeat the latching action of lugs 16 and latches 29, lid 11 must be pushed downward toward container 12 to elevate lug 16 above latch stop 34. Thereafter, lid 11 may be rotated with respect to container 12 and, when each lug 16 is aligned with entry channel 30, lid 11 may be lifted upward and removed from container 12.

In order to impart a more positive locking action, it is desirable to apply an upward biasing force to lid 11 in order to more firmly and positively seat lug 16 in latch 29. In a preferred embodiment of the present invention, such an upward biasing force is created by the interaction of the upper lateral surface of container 12 with lid 11.

Figure 6:
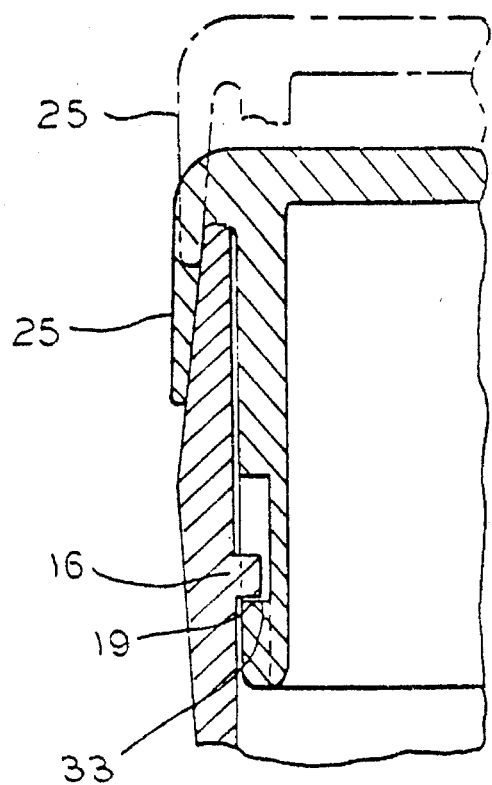
FIG. 6 is an enlarged detail of the circled area in FIG. 1 showing the lid flange in both its flexed and unflexed positions.

As best seen in FIG. 5 and FIG. 6, lid flange 25 is spaced apart a selected distance from skirt 26. Lid 11 and container 12 are preferably formed from an injection moldable thermoplastic material such as polyethylene or polypropylene having a "memory" that is, a natural tendency to return to its original shape once flexed or stressed. Flange 25 thus forms an annular "living hinge" 36 at the outermost periphery of lid top 24. Hinge 36 allows flange 25 to flex with respect to lid skirt 26. To enable the lowermost portion of flange 25 to flex more easily, flange 25 is formed with a tapered cross-sectional configuration such that flange 25 is thicker at its uppermost portion 37 than it is at flange edge 38. An annular flange channel 39, as shown in FIG. 4 and FIG. 5 is thereby formed between skirt 26 and flange 25, and is sized to accept container lip 18 therewithin.

Referring to FIG. 2, it can be seen that the uppermost periphery of container 12 is formed with a cross-sectional thickness which varies as follows. Sidewall 13 is tapered outward beginning at container lip 18 at an angle A with respect to container side wall 13 to form an annular, exterior tapered wedge 40 which extends from lip 18 to a ridge 41, formed around the exterior of container 12. In a preferred embodiment, angle A is about seven degrees, but can range from about three degrees to about forty-five degrees. A thickness T of sidewall 13 is selected to force lid flange 25 to flex outwardly when flange channel 39 is aligned with container lip 18 and is forced downward or toward container 12. The tendency of lid flange 25 to return to its unstressed position causes a force which tends to move lid 11 upward or away from container 12 along wedge 40. In order to secure lid 11 to container 12, lid 11 must be pushed downward with sufficient force to overcome the tendency of lid 11 to move in a direction away from container 12, and thereby rotated to engage lugs 16 with latches 29.

When lid 11 is secured to container 12 as described hereinabove, it can be seen that this upward force will press lug ramp 19 into contact with lower latch wall 33 thus providing a more positive interconnection. FIG. 1 illustrates the interconnection of lid 11 with container 12 and the flexing outwardly of flange 25 at detail B. An enlarged portion of detail B is reproduced as FIG. 6 showing the relative position of flange 25 prior to the attachment of lid 11 to container 12 and after attachment.

In another embodiment of the positive locking system, the thickness of flange 25, skirt 26 and wedge 40, as well as the selection of angle A shown in FIG. 2 are selected to require the application of an upward manual force to move lid 11 along wedge 40 to seat lug 16 in a corresponding latch 29. The "unflexing" of flange 25 and the surface friction at the flange 25/wedge 40 and inner surface 17/skirt 26 interfaces combine to create a positive lock that can be overcome only by a substantial combination of down-and-twist effort on the part of the user.

The abutment of outer skirt wall 28 with interior container wall 17, combined with the overlapping of container lip 18 by flange 25 provides an improved liquid-tight seal to more positively prevent the leakage of liquid during drinking. A preferred embodiment of the present invention thus contemplates substantial contact between outer skirt surface 28 along its entire length with the surface of interior container wall 17.

Figure 9:
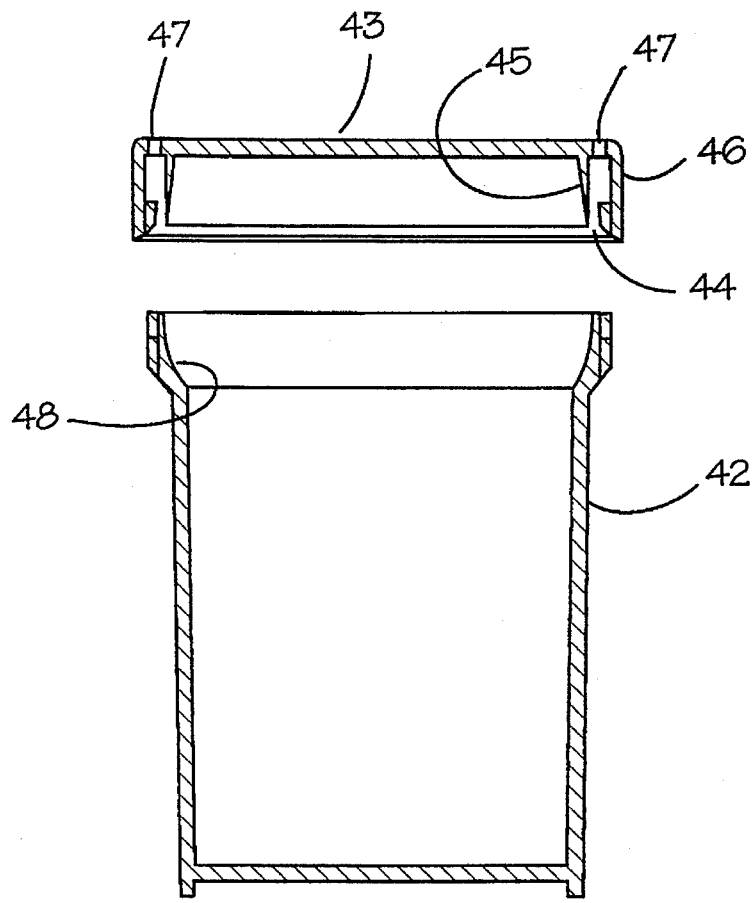
FIG. 9 is a partial, sectional view of a prior art lid and bottle.

Referring to FIG. 9, the prior vial-and-lid combination there depicted is representative of the type of prior art efforts of others over which the present invention offers many advantages, in that the vial-and-lid therein depicted lacks, inter alia, the locking and sealing features described above. A lid 43 is fitted to a vial 42 by aligning the mouth of vial 42 with an annular space 44 formed by an interior lid wall 45 and an exterior lid wall 46. A series of holes, typified at 47, extends about the outer periphery of lid 43 and are positioned to extend into annular space 46. The mouth of vial 42 is slightly inwardly tapered at 48 and contacts interior lid wall 44 to form a minimal area of contact, presumably to close off the path that would otherwise exist through cap 43 via holes 47 into the interior of vial 42.

Figure 7:
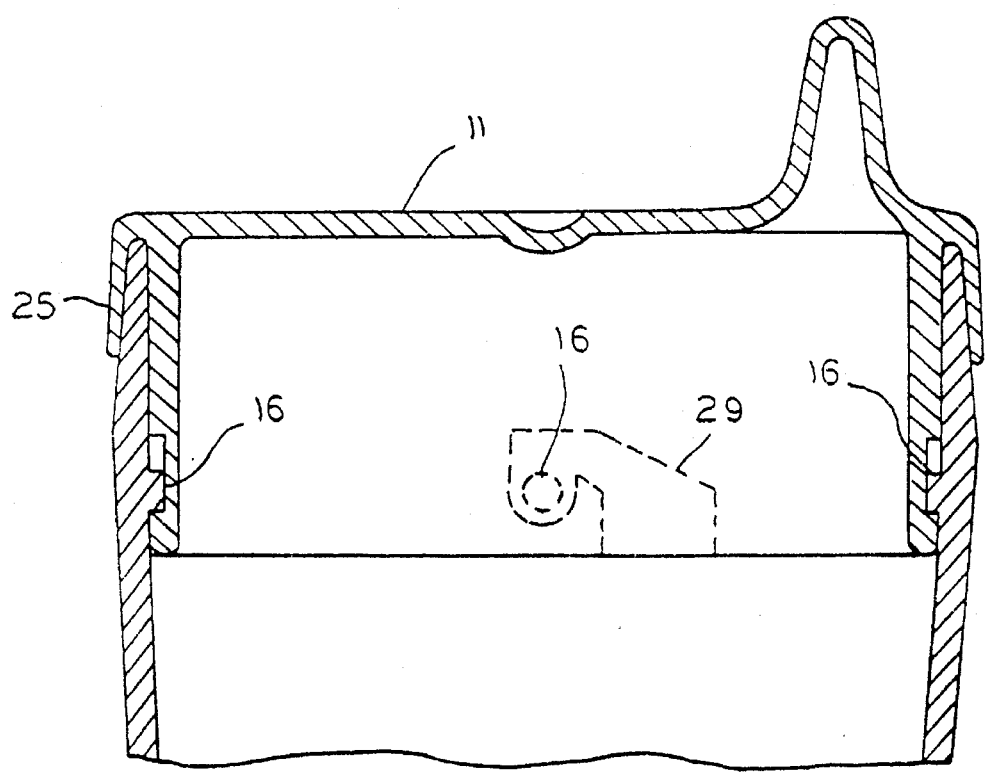
FIG. 7 is a side sectional view of the lid and cup of FIG. 3, showing the use of cylindrical lugs.
Figure 8:
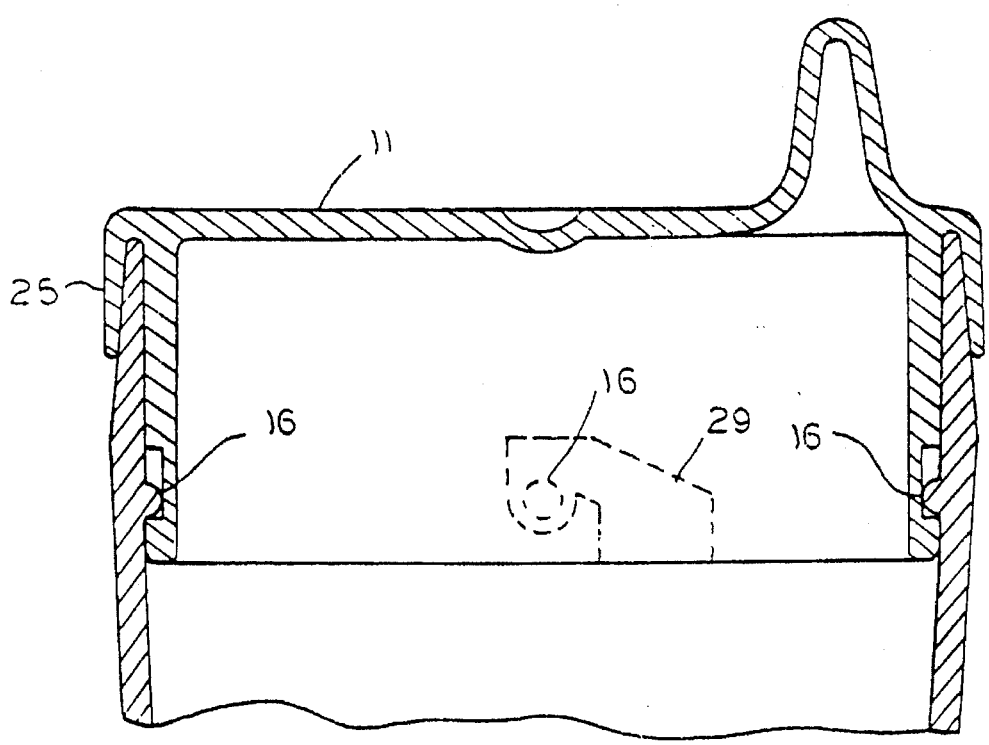
FIG. 8 is a side sectional view of the lid and cup of FIG. 3, showing the use of spherical lugs.

The embodiments discussed also illustrate lugs 16 as being triangular in shape and nesting within a similarly-shaped portion of each latch 29. It is to be understood that the shapes lugs 16 and the corresponding portion of latches 29 may be varied. For example, it is contemplated that lugs 16 be formed as round disc-like projections, as illustrated at 16 of FIG. 7, or spherical projections, as illustrated at 16 of FIG. 8, while latches 29 terminate in a rounded cavity accommodating such a spherical or disc-like shape.

Figure 10:
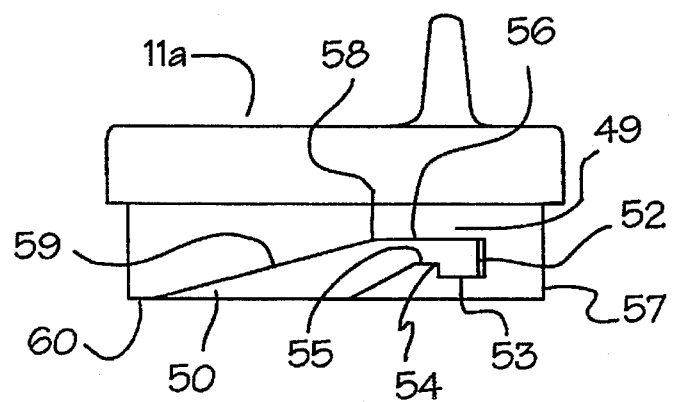
FIG. 10 is a second embodiment of the lid latches shown in FIG. 3.

The preferred embodiment herein has described the use of eight lugs 16 corresponding to a like number of latches 29. It is to be understood that the number of lugs-and-latches may be varied with the degree of ease or difficulty desired to remove lid 11 from container 12. One such variation is shown in FIG. 10, wherein a lid 11a is shown, having four latches 49 spaced equidistantly about the outer surface of skirt 57 and formed as recesses molded into skirt 57. Each latch 49 has a generally elongated configuration that guides the container's locking lugs into engagement with each such latch, as explained in more detail below.

As seen in FIG. 10, each latch 49 has a latch entry 50, a latch end wall 52, a lower latch wall 53, a latch stop 54 and an upper latch stop surface 55 corresponding, generally, to latch end wall 32, lower latch wall 33, latch stop 34 and upper latch stop surface 35, respectively, shown in FIG. 3 and disclosed hereinabove.

In the embodiment of FIG. 10, an upper latch wall 51 has an upper wall segment 56 which extends horizontally from latch end wall 52 a substantial distance along skirt 57 to a break 58 and, thereafter, along upper latch wall ramp 59 which terminates at skirt lip 60.

When lid 11a is put on container 12, lugs 16 will contact lid 11a at either skirt lip 60 or in registration with latch entry 50. Because the lugs and latches are equidistantly spaced, it is expected that all lugs will simultaneously either contact skirt lip 60 or register with latch entry 50. A lug 16 not aligned with latch entry 50 will be trapped by said entry when lid 11a is rotated. As latch entry 50 moves into alignment with lug 16, said lug comes into contact with upper latch wall ramp 59 which guides lug 16 further into latch entry 50 and begins the camming action that draws lid 11a toward container 12. As lid 11a is further rotated, lug 16 is contacted by latch stop ramp 55 which continues the camming action that will result in lug 16 moving past latch stop 54 and being held thereby. If, upon initial placement of lid 11a on container 12, lugs 16 are aligned with latch entries 50, the rotation of lid 11a with respect to container 12 will seat lugs 16 as described above.

The closure of lid 11a thus provides a positive, guiding force during engagement of lid 11a to container 12.

Referring now to FIGS. 11, 12 and 13, the numeral 61 indicates generally a cup handle assembly removably attachable to container 12. As seen in FIGS. 12 and 13, handle assembly 61 has a downwardly-depending handle 62 integrally formed together with a mounting ring 63. While handle 62 is herein shown as extending downward when attached to container 12, it is to be understood and appreciated that other shapes and configurations may be used for handle 62 as well.

Ring 63 is sized and shaped to be closely fit to container 12 at the maximum diameter of sidewall 13. Because container 12 is tapered bottom-to-top, handle assembly 61 is attached by placing bottom 14 through ring 63 and moving ring 63 upward toward lip 18. In a preferred embodiment, ring 63 has one or more tabs 64, seen in FIG. 11, sized and shaped to slip over and "snap over" ridge 41 as seen in FIG. 13. Alternatively, ring 63 is provided with a number of partial "slits", shown at 76 in FIG. 12. As ring 63 is forced onto container 12, slits 76 split apart to grip the side of the container. FIG. 13 shows "open" slits 77 after installation of handle assembly 61. Ring 63 may also be tapered to closely match the taper of container 12, creating a friction fit as well.

Figure 14:
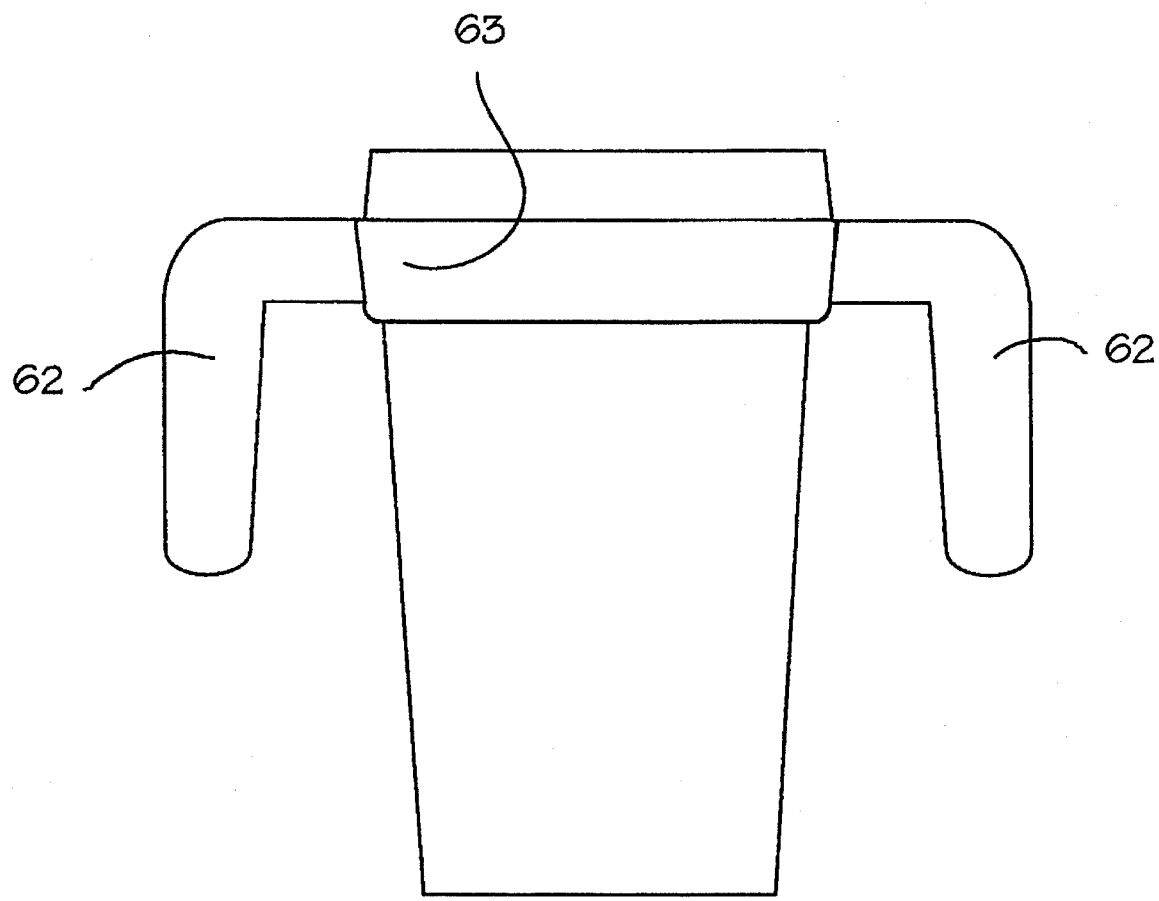
FIG. 14 is a side elevation of a second embodiment of the cup handle.
Figure 15:
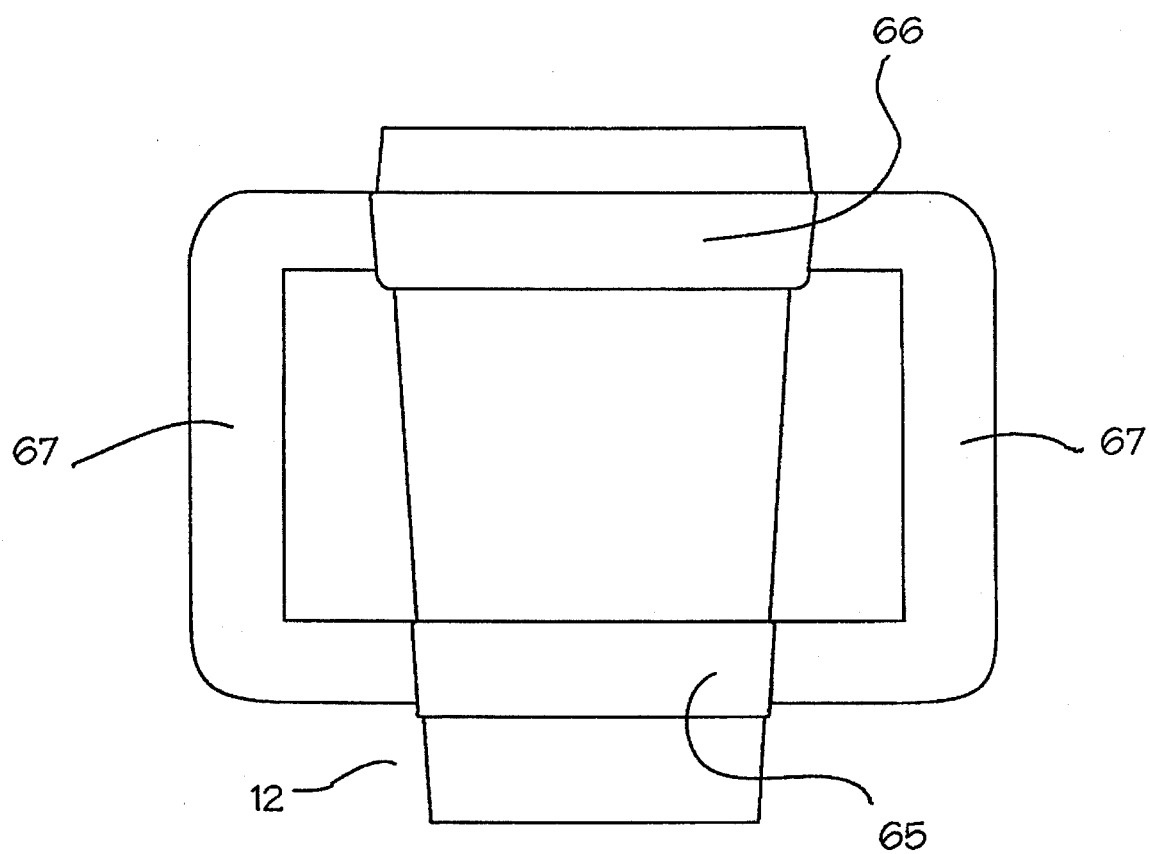
FIG. 15 is a side elevation of a third embodiment of the cup handle.

As shown in FIG. 14, it is also contemplated that more than one handle 62 may be attached to ring 63 to be used, for example, as a child's training cup. As shown in FIG. 15, handle assembly 61 may also include first and second mounting rings 65 and 66 to which handles 67 are attached at both ends thereof.

Attachment of ring 63 is done at a point along sidewall 18 such that the handle assembly does not interfere with the operation of the closure as set forth earlier.

Figure 16:
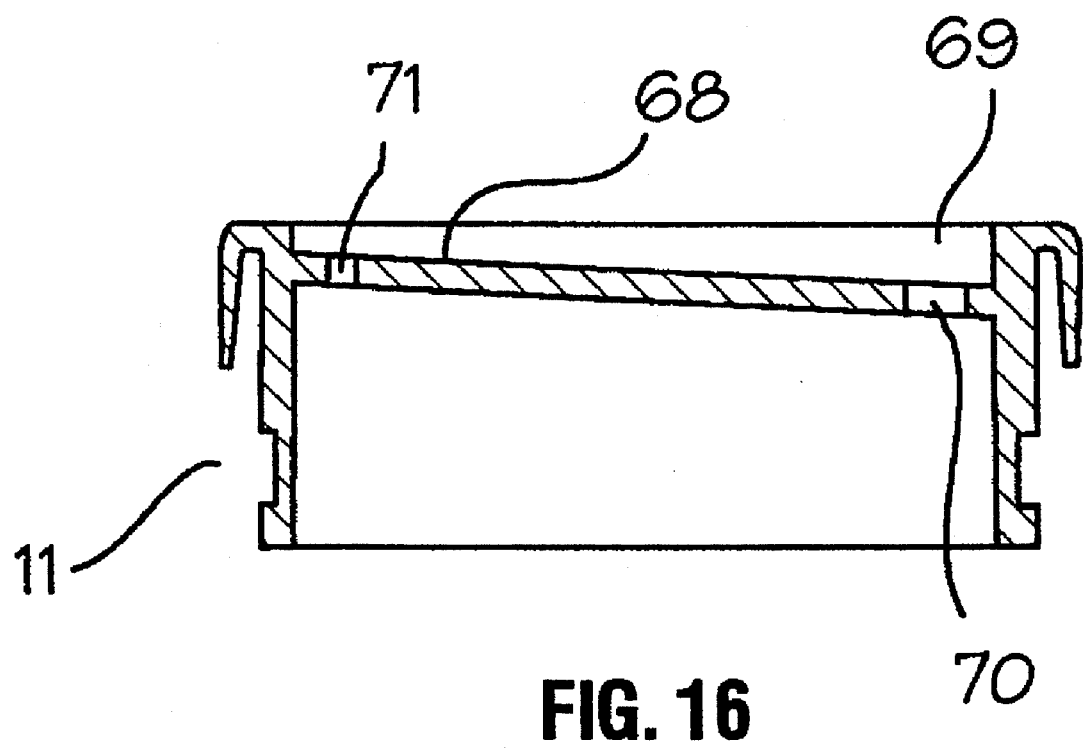
FIG. 16 is a side sectional view of a lid adapted for drinking of coffee or similar liquids.

Referring now to FIG. 16, a cross-sectional view of an alternate embodiment of lid 11 is shown, adapted for use as a lid for drinking coffee and the like. Inclined top surface 68 forms a well 69 at which a drinking opening 70 is formed. A vent 71 may also be included.

Figure 17:
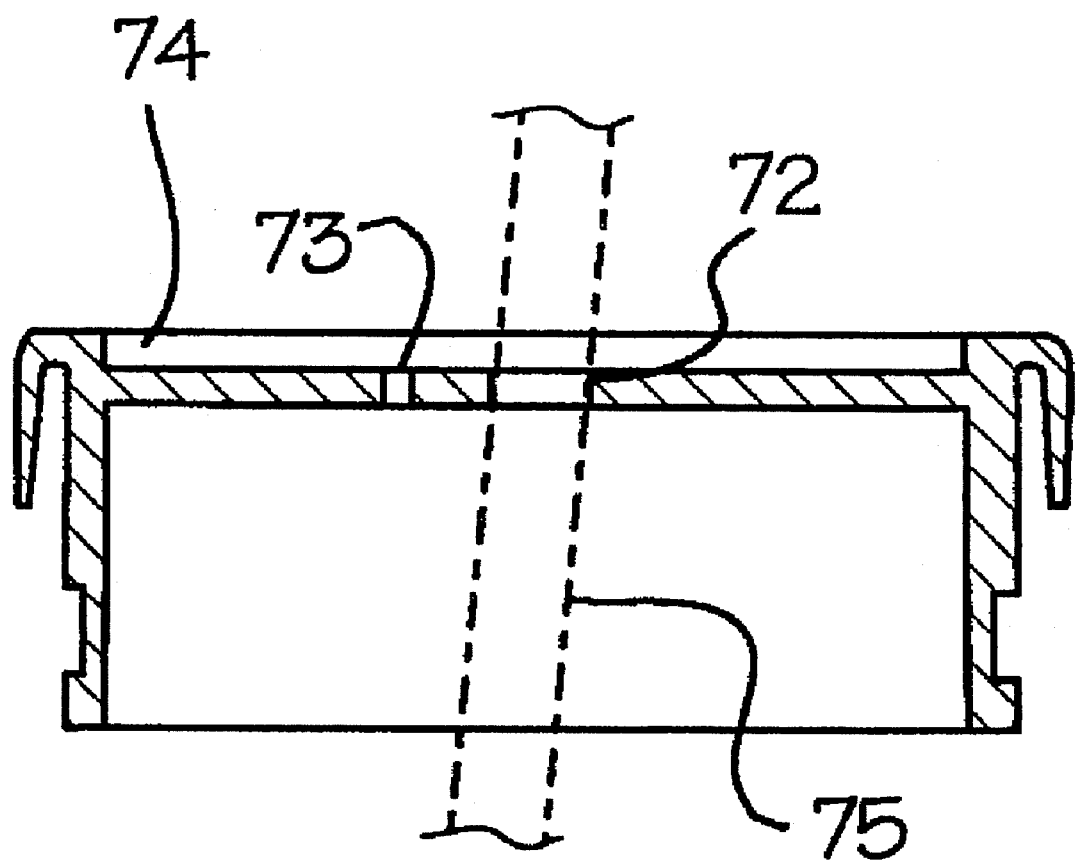
FIG. 17 is a side sectional view of a lid adapted to accept an external drinking straw.

Referring now to FIG. 17, a cross-sectional view of another alternative embodiment of lid 11 is shown having straw hole 72 and vent 73 formed through top 74 to allow the use of a straw 75 to drink the liquid therein.

Lid 11 and container 12 are preferably formed from thermoplastic materials which are sturdy, can flex a great number of times without loosing elasticity or memory and which are easy, convenient and inexpensive to mold. Such materials are well-known in the molding art.

Figure 18:
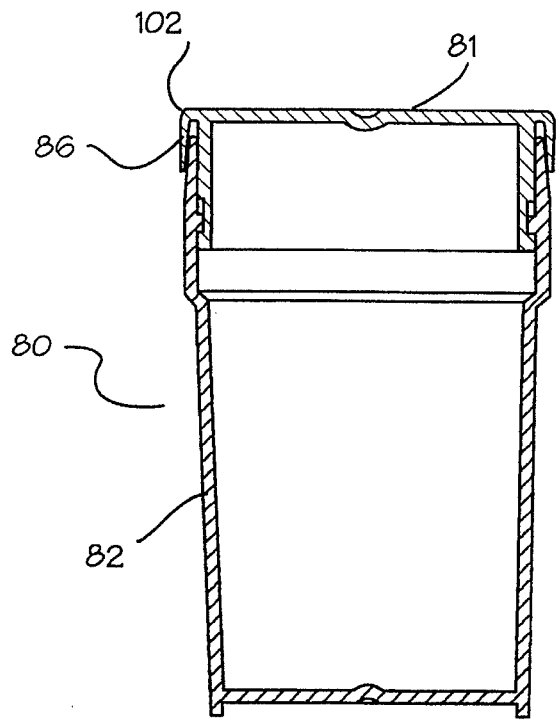
FIG. 18 is a sectional view of an embodiment of the present invention showing a lid assembled to a medicine vial.

Referring now to FIG. 18, the numeral 80 indicates generally a cross-sectional view of a medicine bottle of the type used to package prescription drugs. Bottle 80 has a cap or lid 81 and a vial 82.

Figure 19:
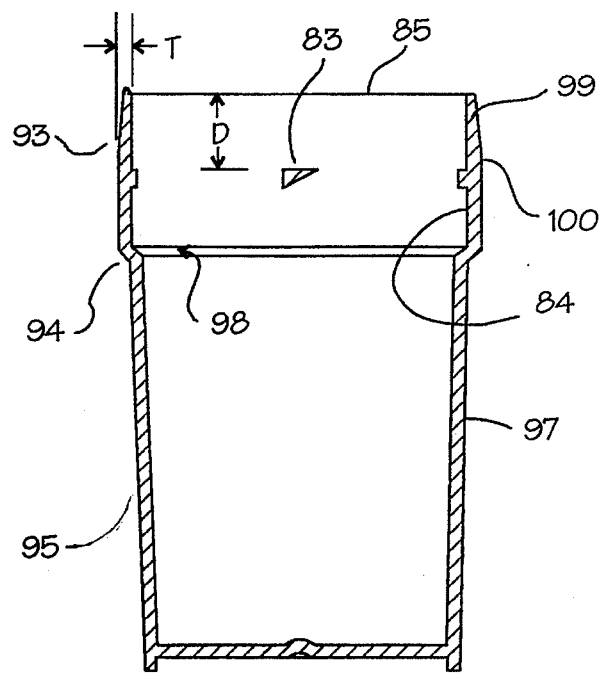
FIG. 19 is a sectional view of the vial of FIG. 18.

FIG. 19 is a sectional view of vial 82. Similar to the construction shown in FIG. 2, a series of lugs 83 is formed on interior wall 84 of vial 82, spaced radially equidistantly about the interior of vial 82 and at an identical distance D from upper lip 85. As described in more detail hereinabove, lugs 83 can be formed in a number of different configurations, and are formed and positioned to enter and engage with latches formed on cap 81 in the same manner as described above in connection with FIGS. 1–3.

Figure 20:
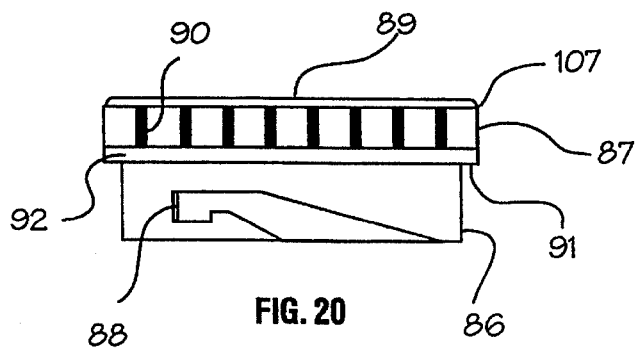
FIG. 20 is a side elevation of the lid of FIG. 18, showing the latches formed thereon.

As seen in FIG. 20, cap 81 has a cap skirt 86 positioned within and concentric with a cap flange 87. Latches, typified at latch 88 are molded into the outer periphery of cap skirt 86 and are generally configured as discussed hereinabove with respect to latches 29. Cap lid 81 is formed with a solid, impermeable top 89 having a series of vertically-extending ribs 90 to form a handgrip. In a preferred embodiment, ribs 90 terminate before reaching flange lip 91 to leave a flat, circumferentially-extending band 92.

Referring now to FIG. 19, it can be seen that vial 82 is formed with an upper mouth segment 93, extending from lip 85 to a bevelled, circumferentially-extending segment 94. A bottom segment 95 extends from bevel 94 to container bottom 96. Thus, as seen in section in FIG. 19, container wall section 97 consists of a first, generally vertical mouth segment 93, a bevelled segment 94 and a generally vertical bottom segment 95. Preferably, wall 97 is of a uniform thickness in all three segments (except as noted hereinbelow), with the profile of inner wall 84 matching the outer profile of vial 82. Preferably, as shown in FIG. 19, mouth segment 93 is larger in diameter than bottom segment 95. A land 98 is thus created within vial 82, having a surface inclined at the same angle as bevel 94.

FIG. 19 also illustrates a taper 99 formed on the exterior of vial 82 and extending from lip 85 to a break 100. Thus, wall thickness T of vial 82 narrows from break 100 to upper lip 85. Preferably, the length of taper 99 is relatively short, to assure the formation of a stiff upper lip.

Figure 21:
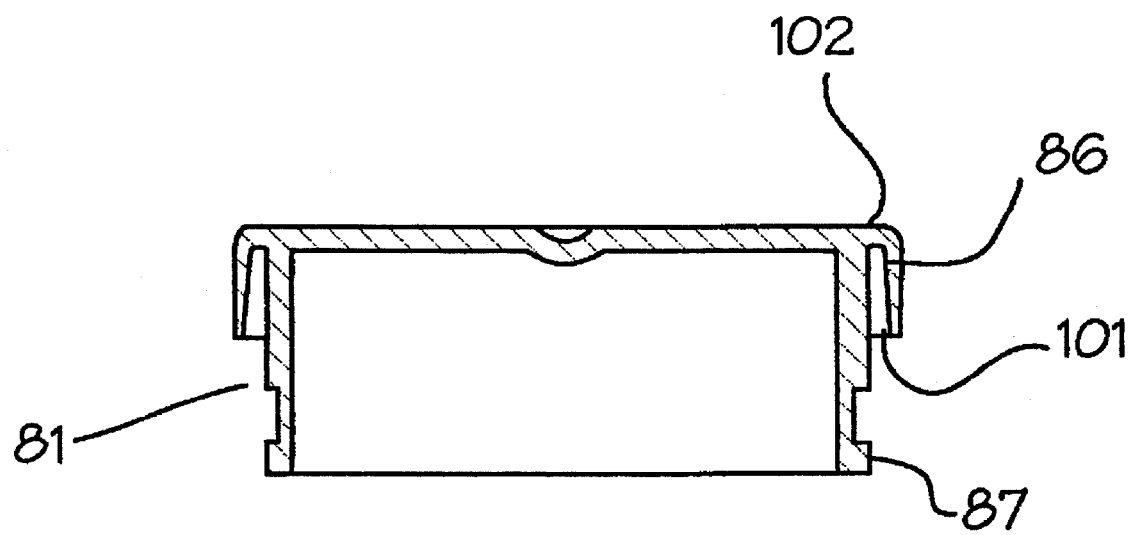
FIG. 21 is a sectional view of the lid shown in FIG. 20.

As seen in FIG. 21, cap 81, shown in cross-section, cap skirt 86 and cap flange 87 form, therebetween, annular flange channel 101, corresponding generally to flange channel 39, earlier described in connection with FIG. 5. Cap 81 is formed from a thermoplastic material selected to enable the creation of an annular living hinge 102 extending about the upper periphery of cap 81. As seen in FIG. 18, taper 99 enters channel 101 when cap 81 is placed on vial 82, flexing flange 87 outward and away from flange 86 and creating an upward biasing force which, as described hereinabove, positively seats lugs 83 in latches 88.

Preferably, when cap 81 is fully seated on vial 82, flange lip 91 is positioned proximate to break 100. This allows for the application of a tamper-evident seal 103 to bottle 80, as shown in section in FIG. 22. The flat surfaces of band 92 and mouth segment 93 provide sites to secure seal 103 with, for example, a selected pressure- or heat-activated adhesive or, alternatively, a shrink-wrap seal.

Figure 22:
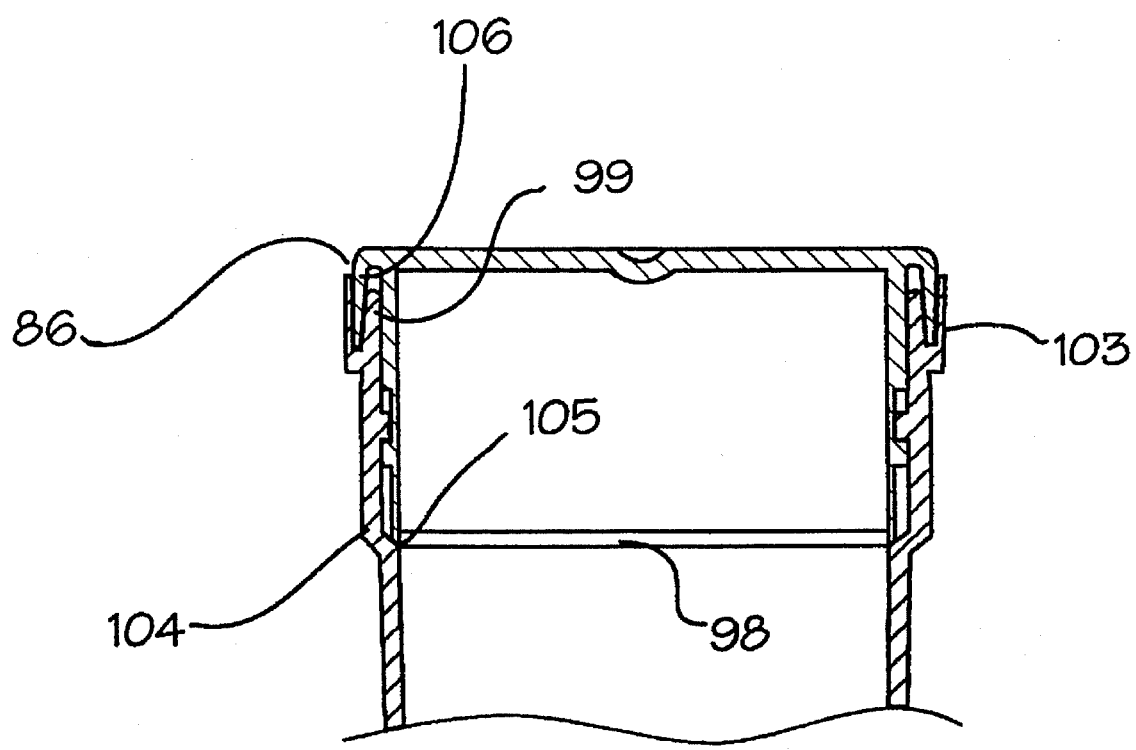
FIG. 22 is a side sectional view of the lid and vial of FIG. 18 showing the addition of a plug seal within the vial.
Figure 23:
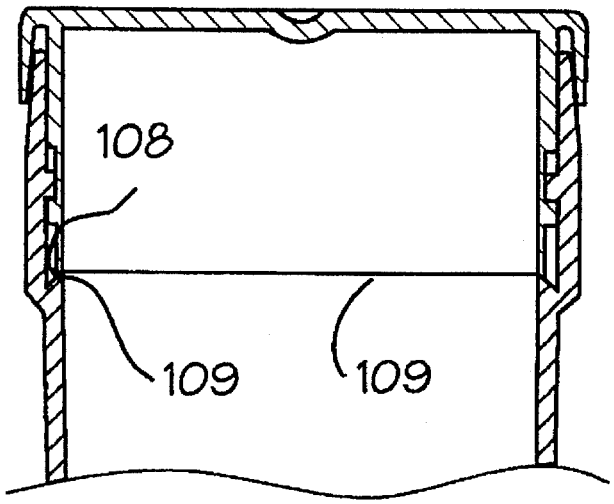
FIG. 23 is a second embodiment of the plug seal.
Figure 24:
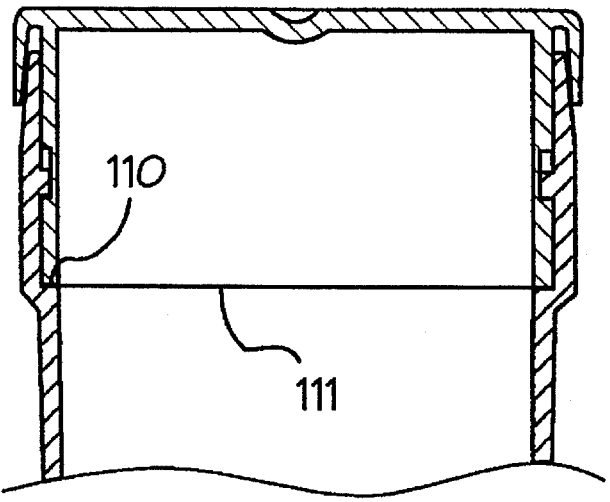
FIG. 24 is a third embodiment of the plug seal.

Referring now to FIGS. 22 and 23, another embodiment of cap 81 is shown fully seated on vial 82. In this embodiment, cap skirt 86 is extended in length and has skirt bevel 104 formed on skirt lip 105. The angle of bevel 104 is identical to that of land 98, and cap skirt 86 is sized such that bevel 104 contacts land 98 when cap 81 is fully seated on vial 82, creating a "plug seal" intended to minimize or prevent leakage into or from bottle 80. This seal is in addition to the seal created by the close contact between inner skirt wall 106 and taper 99, and between outer flange wall 107 and inner container wall 84.

In FIG. 23, another embodiment of cap skirt 86 terminates in a reverse bevel 108, angling inwardly toward the interior of vial 82. A reverse land 109 is formed about inner wall 84 to mate with reverse bevel 108 to create the plug seal described above.

Figure 25:
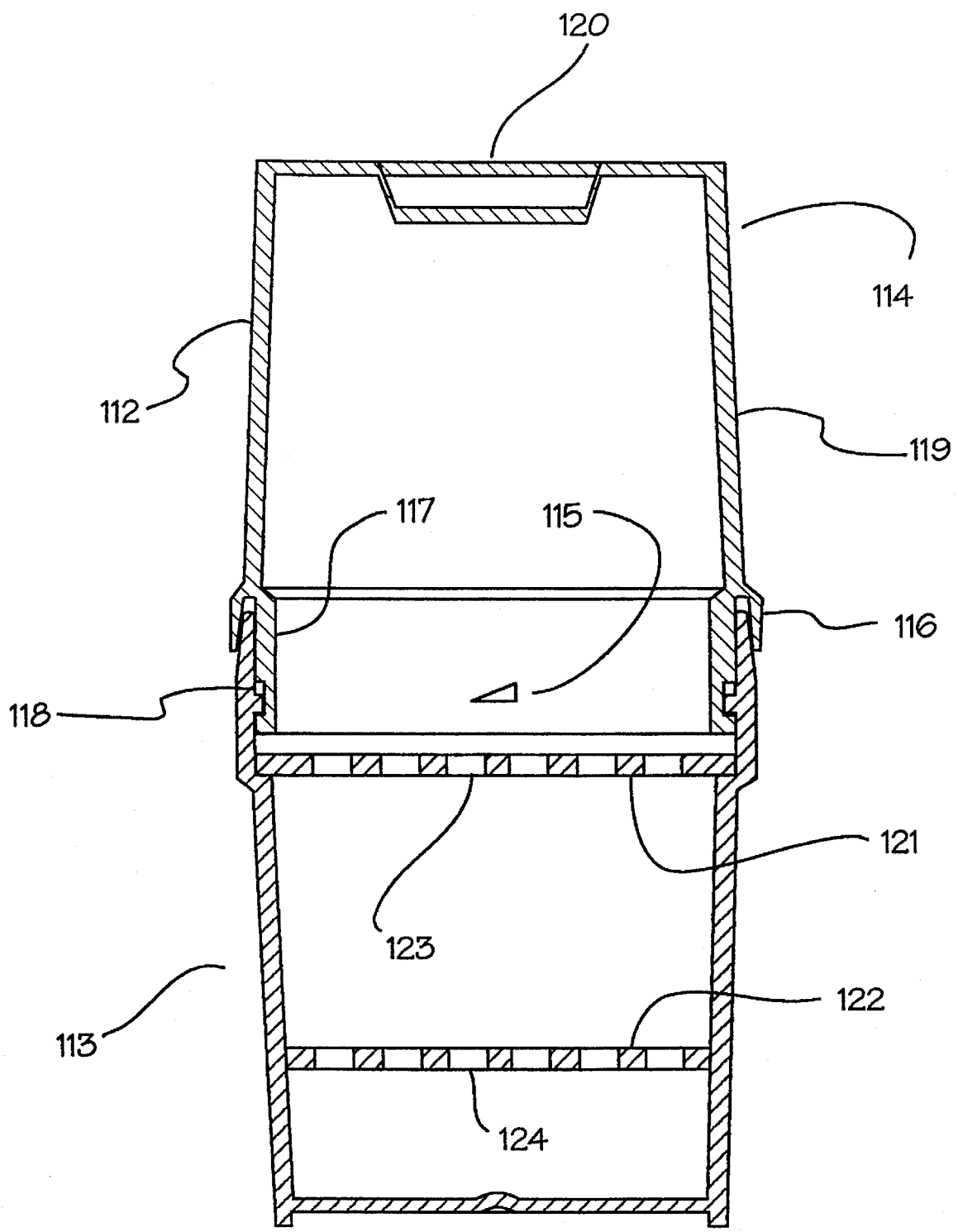
FIG. 25 is a side sectional view of an overcontainer utilizing the present invention.

In FIG. 25, yet another embodiment of the plug seal, skirt lip 110 is unbevelled. or flat, and land 111 extends generally perpendicularly from interior wall surface 84. Flat lip 110 abuts land 111 in a generally horizontally-extending contact to form the plug seal.

Referring now to FIG. 26, the numeral 112 indicates generally a sectional view of an "overcontainer" proposed for use as a carrying container for such fragile and biologically sensitive or controversial material as test tubes containing blood or urine samples. Overcontainer 112 has a base 113 and a top 114. Base 113 has lugs 115 positioned therewithin as described hereinabove, and top 113 has skirt 116 attached to and spaced apart from flange 117 as described hereinabove. Latches 118 are formed on flange 117 in the same manner as disclosed hereinabove.

Top 114 has an extended portion 119, elongated to accommodate items placed within overcontainer 112 that extend above the upper lip of base 113 and to provide a handgrip giving a user enough leverage to overcome the positive locking force created by the interaction of lugs 115 and latches 118. As described hereinabove, the selection of lug-and-latch shape, the surface area of the interface between the interior surface of skirt 116 and the exterior surface of base 113 and the interface between the exterior surface of flange 117 and the interior surface of base 113, and the selection of the thermoplastic material from which overcontainer 112 is formed can be combined to "set" the difficulty of defeating the top/base closure. For example, use of overcontainer 112 to transport blood or urine specimens held in other receptacles calls for a closure of increased operating force. Extension 119 provides an enlarged handgrip to overcome such force for both applying and removing top 114 from base 113. A ribbed or other non-slip surface can preferably be formed on or applied to the exterior surface of base 113 and top 114 to provide a better grip. A handle 120 can also be integrally formed as a part of top 114 to provide a hand grip for opening/closing as well as for a carrying handle.

In a preferred embodiment, base 113 has first and second racks 121 and 122 having vertically-aligned pairs of apertures 123 and 124 to accommodate other containers such as test tubes, syringes and the like. Racks 121 and 122 keep such containers upright and apart to limit damage from breakage.

Each of the embodiments discussed herein may also incorporate a visual indicator signalling whether the container closure is fully closed, that is, whether the lugs formed on the interior of the container are fully seated in the latches formed on the exterior of the flange formed as part of the top. Referring now to FIGS. 1 and 2, one such indicator includes applying a colored strip to wedge 40, and proportioning flange 25 of top 11 such that when lugs 16 are fully seated in latches 29, wedge 40 is fully exposed. Thus, if the colored strip is not exposed, it is an indicator that cap 11 is not fully locked onto container 12. Referring now to FIG. 19, one such indicator includes applying a colored strip to taper 99, and proportioning flange 87 of top 89 such that when lugs 83 are fully seated in latches 88, taper 99 is fully exposed. Thus, if the colored strip is not exposed, it is an indicator that cap 81 is not fully locked onto vial 82.

Ajusting the difficulty of removing cap 89 involves adjusting such factors as the number and shape of the lugs and latches, the angle of taper of the vial wall, etc. Where these factors are used to adjust the difficulty, it is contemplated that a visual indicator be sued to warn potential users that the difficulty of removing cap 89 has been lessened. One such warning would be to make easier-to-remove caps a selected color, with the color itself warning that the closure is less difficult to operate.

It should be understood that the other expedients described herein, such as the application of a non-skid coating to the container top and/or bottom applies to all of the various embodiments disclosed herein.

While the closure described hereinabove has been presented in various particular embodiments such as a closure for a drinking cup, for a medicine vial/specimen cup and for an overcontainer for medical specimens, it should be readily recognized that the closure also may be employed for any container with a lid whose removal is to be made more difficult for a variety of purposes, or to join any cylindrical members adaptable to be telescopically engaged.

While the foregoing has described particular embodiments of the present invention, it is to be understood that this description is presented by way of example only. It is expected that others, skilled in the art, will perceive of variations which, while differing from the foregoing, do not depart from the spirit and scope of the invention as herein described and claimed. The foregoing description is not meant to limit the scope of the claimed invention in any manner.

What is claimed is:

1. A covered receptacle, comprising:

an open mouthed container having a generally cylindrical wall terminating at and integral with a base, said container having interior and exterior wall surfaces meeting at said open mouth at a lip which defines the mouth of said container, said container having a plurality of lugs formed on and projecting inwardly from said interior wall surface proximate said lip, a lid for said container, said lid having a top panel terminating in an annular flange depending therefrom, said flange having inner and outer flange walls terminating at an annular flange lip, an annular skirt depending from said top panel and positioned within and coaxial with said flange, said skirt having inner and outer skirt walls terminating at an annular skirt lip, said flange and said skirt defining therebetween an annular channel, said channel configured and dimensioned to receive said container lip and a portion of the upper periphery of said container when said lid is placed on said container, latch means formed on said outer skirt wall, said latch means configured and positioned to interengage said lugs when said lid is placed on said container, and means to bias said lid away from said container to hold said lugs in interengagement with said latch means.

2. A covered receptacle, comprising:

an open mouthed container having a generally cylindrical wall terminating at and integral with a base, said container having interior and exterior wall surfaces meeting at said open mouth at a lip which defines the mouth of said container, said container having a plurality of lugs formed on and projecting inwardly from said interior wall surface proximate said lip;

a lid for said container, said lid having a top panel terminating in an annular flange depending therefrom, said flange having inner and outer flange walls terminating at an annular flange lip;

an annular skirt depending from said top panel and positioned within and coaxial with said flange, said skirt having inner and outer skirt walls terminating at an annular skirt lip, said lid being formed of a flexible thermoplastic material enabling said flange to be flexed with respect to said skirt, said flange and said skirt defining therebetween an annular channel, said channel configured and dimensioned to receive said container lip and a portion of the upper periphery of said container when said lid is placed on said container, latch means formed in said outer skirt wall, said latch means configured and positioned to interengage said lugs when said lid is placed on said container;

means to bias said lid away from said container to hold said lugs in interengagement with said latch means;

said biasing means including a thickened portion of said upper periphery of said container wall tapering from a relatively narrow configuration at said mouth to a relatively thicker configuration towards said base whereby said flange is flexed outwardly from said skirt when said lid is pressed downwardly onto said container.

3. The apparatus as recited in claim 2 wherein said thermoplastic material is polypropylene or polyethylene.

4. The apparatus as recited in claim 2 wherein said latch means includes a channel molded into the outer surface of said skirt, said channel beginning at said skirt lip and terminating at an end wall, a channel stop member positioned intermediate said end wall and said beginning of said channel.

5. The apparatus as recited in claim 4 wherein said termination of said channel is sized and shaped to a cavity form complementary in size and shape to that of said lug.

6. The apparatus as recited in claim 5 wherein said lug is formed as a triangle.

7. The apparatus as recited in claim 5 wherein said lug is formed as a disk.

8. The apparatus as recited in claim 5 wherein said lug is formed as a spherical section.

9. The apparatus as recited in claim 2 wherein said exterior wall surface of said container is tapered at an angle of seven degrees with respect to said inner wall surface of said container.

10. The apparatus as recited in claim 2 wherein said outer skirt wall and said inner container wall contact one another along substantially the entire length of said skirt wall when said lid is assembled to said container to form a liquid-tight seal.

11. The apparatus as recited in claim 5 wherein said lug is formed as a trapezoid.

12. The apparatus as recited in claim 2 wherein said container has four such lugs formed thereon and said lid has four such latch means formed thereon.

13. The apparatus as recited in claim 2 wherein said receptacle is a drinking cup.

14. The apparatus as recited in claim 13 wherein said latch means includes a channel molded into the outer surface of said skirt, said channel beginning at said skirt lip and terminating at an end wall, a channel stop member positioned intermediate said end wall and said beginning of said channel.

15. The apparatus as recited in claim 14 wherein said termination of said channel is sized and shaped to form a cavity complementary in size and shape to that of said lug.

16. The apparatus as recited in claim 15 wherein said lug is formed as a triangle.

17. The apparatus as recited in claim 15 wherein said lug is formed as a trapezoid.

18. The apparatus as recited in claim 15 wherein said lug is formed as a disk.

19. The apparatus as recited in claim 15 wherein said lug is formed as a spherical section.

20. The apparatus as recited in claim 15 wherein said outer skirt wall and said inner container wall contact one another along substantially the entire length of said skirt wall when said lid is assembled to said container to form a liquid-tight seal.

21. The apparatus as recited in claim 2 wherein said receptacle is a child-resistant package.

22. The apparatus as recited in claim 21 wherein said thermoplastic material is polypropylene or polyethylene.

23. The apparatus as recited in claim 21 wherein said latch means includes a channel molded into the outer surface of said skirt, said channel beginning at said skirt lip and terminating at an end wall; and a channel stop member positioned intermediate said end wall and said beginning of said channel.

24. The apparatus as recited in claim 23 wherein said termination of said channel is sized and shaped to form a cavity complementary in size and shape to that of said lug.

25. The apparatus as recited in claim 24 wherein said lug is formed as a triangle.

26. The apparatus as recited in claim 24 wherein said lug is formed as a disk.

27. The apparatus as recited in claim 24 wherein said lug is formed as a spherical section.

28. The apparatus as recited in claim 24 wherein said lug is formed as a trapezoid.

29. The apparatus as recited in claim 21 wherein said exterior wall surface of said container is tapered at an angle of seven degrees with respect to said inner wall surface of said container.

30. The apparatus as recited in claim 21 wherein said outer skirt wall and said inner container wall contact one another along substantially the entire length of said skirt wall when said lid is assembled to said container to form a liquid-tight seal.

31. The apparatus as recited in claim 21 wherein said closure further includes means formed on said lid for gripping said lid, enabling said lid to be manipulated to engage or disengage said closure.

32. The apparatus as recited in claim 31 wherein said gripping means includes a series of vertically-extending ribs formed on said outer flange wall.

33. The apparatus as recited in claim 21 wherein said container has three such lugs formed thereon and said lid has three such latch means formed thereon.

34. The apparatus as recited in claim 21 wherein said container has eight such lugs formed thereon and said lid has eight such latch means formed thereon.

35. The apparatus as recited in claim 21 wherein said container has four such lugs formed thereon and said lid has four such latch means formed thereon.

36. The apparatus as recited in claim 21 wherein said closure further includes a visual signal indicating whether said closure is fully engaged.

37. The apparatus as recited in claim 36 wherein said signal is a colored band positioned on said taper, said band being fully exposed when said closure is fully engaged to bias said cap away from said container.

38. The apparatus as recited in claim 13 wherein said cup is tapered from bottom to top and said apparatus includes a handle assembly, said handle assembly including a first mounting ring sized and dimensioned to fit about the outer periphery of said container without interfering with the attachment of said lid to said receptacle, and at least one handle integral with said ring.

39. The apparatus as recited in claim 38 wherein said ring is dimensioned to engage said receptacle in a friction fit.

40. The apparatus as recited in claim 38 wherein said receptacle has a ridge formed circumferentially about the exterior surface thereof and said ring snaps over said ridge to retain said ring on said receptacle.

41. The apparatus as recited in claim 38 wherein said handle assembly includes two said handles attached to said ring.

42. The apparatus as recited in claim 41 wherein said handle assembly includes two said handles; and a second mounting ring sized and dimensioned to engage said receptacle at a point spaced apart from said first mounting ring, said handles attached at one end thereof to said first ring and at another end thereof to said second ring.

43. The apparatus as recited in claim 13 wherein said lid has a drinking spout formed integrally therewith, said spout having a drinking passage formed therethrough to communicate to the interior of said container.

44. The apparatus as recited in claim 43 wherein said lid is a coffee sipper lid.

45. The apparatus as recited in claim 43 wherein said lid has an aperture formed therethrough sized and dimensioned to place a drinking straw therethrough.

46. A closure system for releasably attaching first and second cylindrical members together, said first member having a generally cylindrical wall having first interior and first exterior wall surfaces meeting at a first mouth to form a first lip which defines said first mouth, said second member having a generally cylindrical wall having second interior and second exterior wall surfaces meeting at a second mouth to form a second lip which defines said second mouth, said closure system comprising:

said first member having a diameter larger than that of said second member whereby said first and second members are telescopically engageable;

a plurality of lugs formed on and projecting inwardly from said first interior wall surface proximate said first lip;

an annular skirt attached to said second exterior surface, said skirt having inner and outer skirt walls terminating at an annular skirt lip;

said skirt being formed of a flexible thermoplastic material enabling said skirt to be flexed with respect to said second member, said second member and said skirt defining therebetween an annular channel, said channel configured and dimensioned to receive said first lip and a portion of the periphery of said first member when said second member is telescopically engaged with said first member;

latch means formed in said second exterior wall, said latch means configured and positioned to interengage said lugs when said first and second members are telescopically engaged;

means to bias said first member away from said second member to hold said lugs in interengagement with said latch means;

said biasing means including a thickened portion of said first member at said first lip tapering from a relatively narrow configuration at said first mouth to a relatively thicker configuration away from said first mouth whereby said skirt is flexed outwardly from said second member when said first and second members are telescopically engaged.

47. The apparatus as recited in claim 46 wherein said thermoplastic material is polypropylene or polyethylene.

48. The apparatus as recited in claim 46 wherein said first exterior wall surface of said first member is tapered at said first lip at an angle of seven degrees with respect to said first interior wall surface of said first member.

49. The apparatus as recited in claim 46 wherein said first exterior wall surface and said inner skirt wall contact one another along substantially the entire length of said skirt wall to form a liquid-tight seal when said first and second members are telescopically engaged.

50. The apparatus as recited in claim 46 wherein said first member has eight such lugs formed thereon and said second member has eight such latch means formed thereon.

51. The apparatus as recited in claim 46 wherein said first member has four such lugs formed thereon and said second member has four such latch means formed thereon.

52. The apparatus as recited in claim 46 wherein said first member has three such lugs formed thereon and said second member has three such latch means formed thereon.

53. The apparatus as recited in claim 46 wherein said latch means includes a channel molded into said second exterior surface, said channel beginning at said second lip and terminating at an end wall, a channel stop member positioned intermediate said end wall and said beginning of said channel.

54. The apparatus as recited in claim 53 wherein said termination of said channel is sized and shaped to a cavity form complementary in size and shape to that of said lug.

55. The apparatus as recited in claim 54 wherein said lug is formed as a triangle.

56. The apparatus as recited in claim 54 wherein said lug is formed as a disk.

57. The apparatus as recited in claim 54 wherein said lug is formed as a spherical section.

58. The apparatus as recited in claim 54 wherein said lug is formed as a trapezoid.

* * * * *